Figure 1:
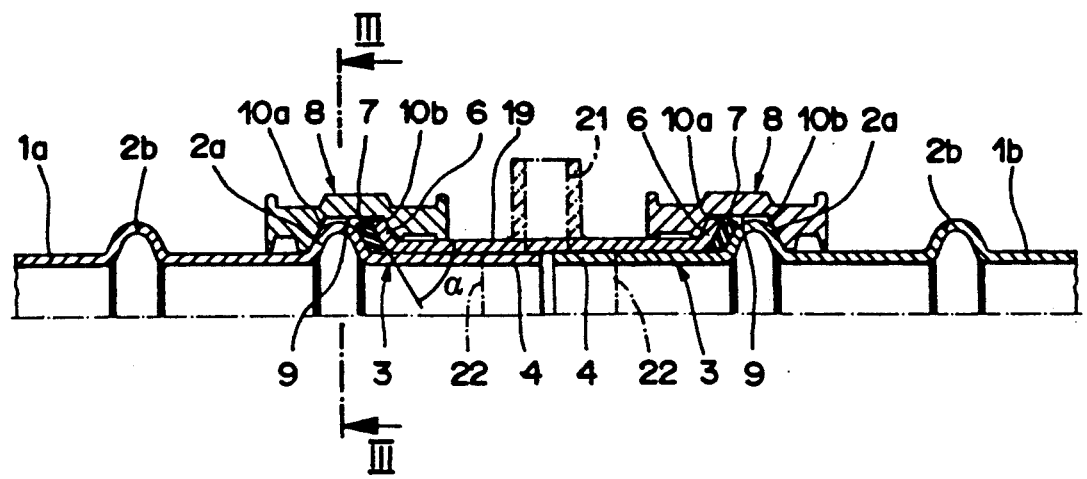

United States Patent [19]
Lüthi

[11] Patent Number: 5,320,391
[45] Date of Patent: Jun. 14, 1994

[54] DEVICE FOR CONNECTING TWO SHEATHS

[75] Inventor: Kurt Lüthi, Gwatt, Switzerland

[73] Assignee: VSL International AG, Bern, Switzerland

[21] Appl. No.: 905,571

[22] Filed: Jun. 26, 1992

[30] Foreign Application Priority Data

Apr. 7, 1991 [CH] Switzerland .................. 1985/91

[51] Int. Cl.$^5$ ............................................. F16L 17/02
[52] U.S. Cl. .................................. 285/365; 285/369; 285/921
[58] Field of Search .............. 285/369, 410, 921, 366, 285/367, 365, 408, 424, 373

[56] References Cited

U.S. PATENT DOCUMENTS

| | | | |
|---|---|---|---|
| 2,269,664 | 1/1942 | Hallerberg | 285/367 X |
| 3,865,413 | 2/1975 | Mizusawa | 285/367 |
| 4,202,568 | 5/1980 | Strom | 285/365 X |
| 4,591,193 | 5/1986 | Oltmanns et al. | 285/369 X |
| 4,695,080 | 9/1987 | Oetiker | 285/365 X |
| 4,958,861 | 9/1990 | Hamilton | 285/365 X |
| 5,015,013 | 5/1991 | Nalin | 285/921 |

FOREIGN PATENT DOCUMENTS

| | | |
|---|---|---|
| 363745 | 8/1981 | Austria . |
| 2335119 | 3/1974 | Fed. Rep. of Germany . |
| 2910684 | 2/1980 | Fed. Rep. of Germany . |
| 677395 | 5/1991 | Switzerland . |

*Primary Examiner*—Dave W. Arola
*Attorney, Agent, or Firm*—Oldham, Oldham & Wilson Co.

[57] ABSTRACT

To connect two sheaths (1a, 1b), used in prestressing cable technology for concrete supporting structures, there is a coupling element (19) which is fitted with chamfered flanges (6). The sheaths (1a, 1b), which have protrusions (2a, 2b), are each inserted into the coupling element (19) with a tubular element (4) which forms the end of the sheaths (1a, 1b). A sealing ring (7) is inserted between each of the flanges (6) and protrusions (2a) of the sheaths (1a, 1b). The flanges (6) and the protrusions (2a) are held together by sloping surfaces (10a) and (10b) of a groove worked in each socket (8). Each of the sockets (8) consists of two half portions (8a) and (8b), which can be connected together.

14 Claims, 2 Drawing Sheets

DEVICE FOR CONNECTING TWO SHEATHS

The invention concerns a device for connecting two sheaths intended for receiving prestressing cables in concrete supporting structures and which are each provided with protrusions spaced at a distance one from the other, consisting of a socket, made up of two parts which encompass a portion of the sheath ends, and of a sealing means.

Sheath connections of this type are already known of in the field of prestressing cable technology for the construction of concrete supporting structures. For example, CH-PS 677 395 discloses a connecting socket made of plastic, for joining two coaxially abutting sheaths, or for joining a sheath to the anchorage with a transition part disposed coaxially to the sheath. A socket, consisting of two portions, which encompasses the two sheath ends to be joined and which holds them together coaxially serves this purpose. At each end of the socket there are two encircling ribs. One sheath protrusion rests in the groove formed by each pair of ribs, thereby fixing the sheaths. Since the rib pairs receiving the sheath protrusions are simultaneously fitted with sealing lips to protect against corrosion and to prevent the intrusion of fluid, particularly cement slurry, and therefore tend to be made of a soft, elastic material, the sheaths are not sufficiently supported at these points. It is indeed often the case that at these points the sheaths tend to move in relation to the socket, especially in the case of collapsing stress. In order to avoid such movement, the centre portion of the socket, ie. the portion where the sheaths to be connected abut, is provided with encircling ribs which are intended assume this supporting function. However, since the support given by the additional ribs is provided at the point where the sheaths to be connected abut, it does not have an optimum effect, particularly if the two sheaths to be connected do not rest against each other at the connecting point Due to the possible movement of the two connected sheaths in relation to the socket the risk arises that the seal provided by the sealing lips against the intrusion of water cannot be guaranteed with certainty, particularly since the sealing lips are moulded onto the two portions of the socket and thus also encompass the sheath in two parts, thereby giving rise to joining points.

DE-PS 23 35 119 discloses a way in which two sheaths can be joined watertightly by means of a socket and a sealing ring In order to do so it is assumed that the end of one of the sheaths is designed in such a way that it can be inserted into the end of the other sheath, thus resulting in an overlapping sheath connection. The socket, which is provided on the inside with an encircling groove, encompasses abutting protrusions formed on the sheaths. Since in this case the sheaths have to be sectioned and connected at the point of construction, the two ends of the sheaths cannot be overlappingly inserted into each other, but at best can only abut coaxially against each other at their end faces.

It is the task of this invention to provide a device for connecting two sheaths, which is easily assembled, which permits a good transfer of mechanical stress from one sheath to the other, and which, in order to protect against corrosion, ensures absolute sealing against penetrating fluid, in particular cement slurry.

According to the invention, the solution of the task is provided by a device having the following features:

a coupling element designed to connect the sheaths which abut substantially at their end faces, having a flange at each of its two end faces, the coupling element can be pushed onto the end of one sheath until the circular outside of one flange comes to rest on the first protrusion of one sheath, and the other sheath can be inserted into the coupling element until the circular outside of the other flange comes to rest on the first protrusion of the other sheath, two sockets, each consisting of at least two connecting portions which, disposed centrally on the inside, have an encircling trapezoidal groove whose ring-shaped sloping surfaces serve to fix the flange or the protrusion of one or other of the sheaths, two sealing means, of which one is disposed between the protrusion of the sheath and one of the flanges of the coupling element, and the other between the protrusion of the sheath and the other flange.

The flanges of the coupling element are advantageously chamfered so that on the one hand, they rest over practically their whole surface on the sloping surface of the encircling trapezoidal groove which is moulded in the sockets, and so that on the other hand, there is optimum support for the protrusion of the sheath. If a sealing ring is positioned between the sloping surface of each flange and each sheath protrusion an optimum seal against the intrusion of fluid can be achieved.

The coupling element embraces the two sheath end portions completely up to the first protrusions, thus ensuring the transfer from one sheath to another of mechanical stresses, and particularly of collapsing stress.

A further advantageous embodiment of the invention consists in that each of the sockets consisting of two half portions is hinged in the axial direction on one side, whilst the other side is provided with a snap mechanism which latches independently when the two halves are pressed together, thus rigidly connecting the two halves together. Easy socket assembly is thereby achieved.

Further advantageous embodiments of the invention are disclosed in the other sub-claims.

Figure 2:
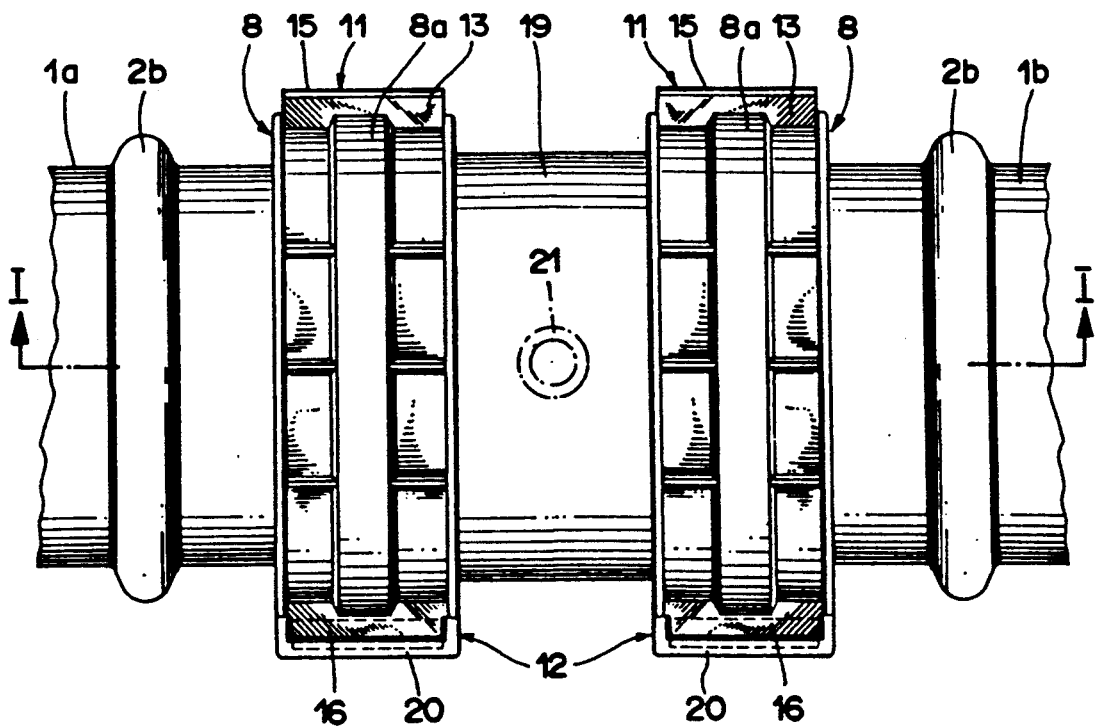
Figure 3:
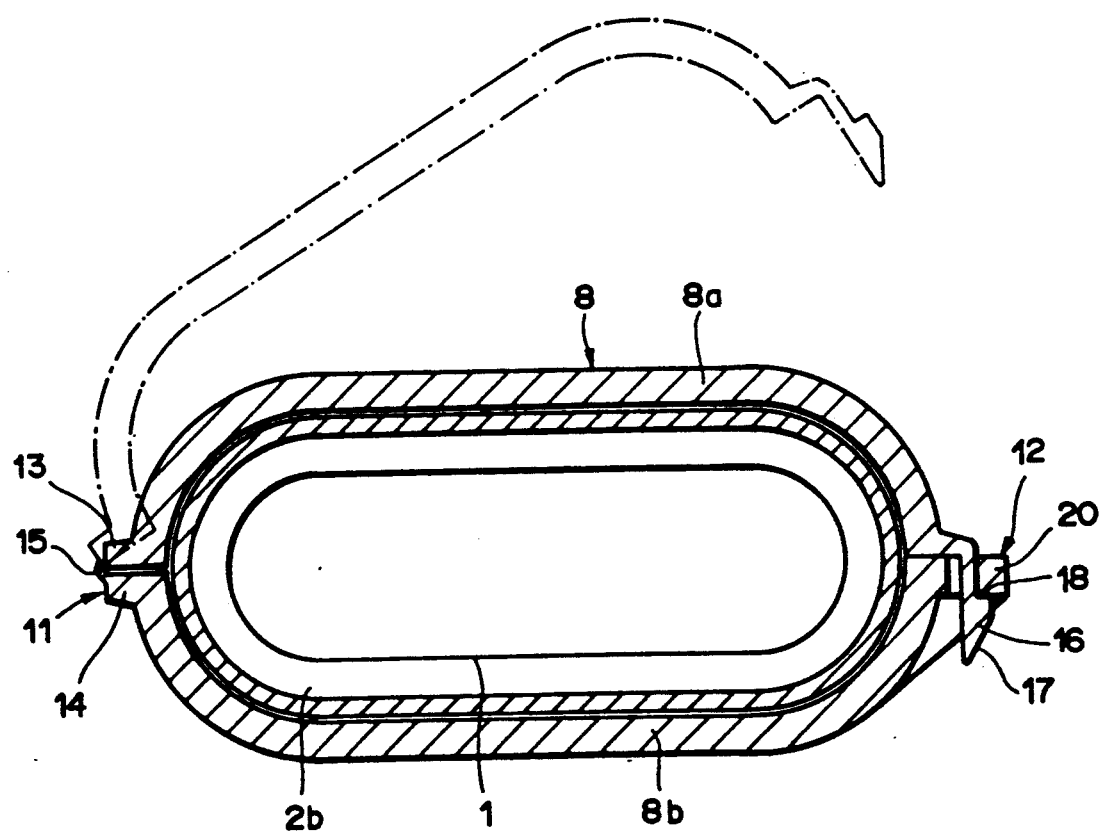

One embodiment of the invention will be described below in more detail, with reference to the drawings, in which:

FIG. 1 is a longitudinal section of a sheath-coupling element-sheath connection along line I—I of FIG. 2, FIG. 2 is a top plan view of the connection of FIG. 1, and FIG. 3 is a section of the socket along the line III—III of FIG. 1.

In FIG. 1, the sheaths 1a, 1b are provided with spaced protrusions 2a, 2b. The sheath ends 3 are designed so that a tubular element 4 is moulded onto each protrusion. A coupling element 19 can be pushed onto the tubular element 4 of the sheath 1a. In this area, the inside of the coupling element corresponds with the outside of the tubular element 4 of the sheath end 3. The end of the coupling element 19 which is to be connected with the sheath 1a is fitted with a flange 6. This flange 6 is inclined by an angle $\alpha$ in relation to the surface of the coupling element 19. A sealing ring 7, made of flexible material, is inserted between the flange 6 and the first protrusion 2a of the sheath 1a. The coupling element 19 is pushed onto the shaft end 3 until the sealing ring 7 is held fast between the flange 6 of the connecting element 5 and the first protrusion 2a of the sheath 1a.

To fix the coupling element 19 in this position a socket 8, consisting according to FIG. 3 of two half portions 8a and 8b, encompasses the sheath 1a and the coupling element 19. Incorporated on the inside of the socket 8 there is a centrally disposed encircling trapezoidal groove 9. This trapezoidal groove 9 is limited on both sides by sloping surfaces 10a and 10b. When the socket 8 is assembled, the sloping surface 10a serves as the support surface for the protrusion 2a and the flange 6 of the coupling element 19 rests on the sloping surface 10b. The two sloping surfaces 10a and 10b of the trapezoidal groove 9 have an inclined angle which corresponds approximately to the angle $\alpha$ of the flange 6 of the coupling element 19 and to the pitch angle of the protrusion 2a.

When the socket 8 is fitted around the point at which the sheath 1a and the coupling element 19 connect, the sloping surfaces 10a and 10b of the trapezoidal groove 9, on which the flange 6 of the coupling element 19 rests, additionally press together the flange and the protrusion 2a of the sheath 1, and the flexible material of the sealing ring 7 allows it to be further compressed. A connection guaranteeing an absolute seal against the intrusion of fluid, in particular cement slurry, is thereby achieved Since the coupling element is fitted at both ends with a flange 6, the end 3 of the sheath 1b can be connected with the other end of the coupling element 19 in exactly the same way as described above. To do so, a second socket 8 and a second sealing ring 7 are required. The coupling element 19 is suitable for adapting sheaths which are to be joined to the total length required in the construction. To do so, coupling elements of varying lengths are manufactured, although the difference from the longest to the shortest coupling element is the same as the distribution of the spacing of the protrusions.

This arrangement permits an absolutely fluid-tight connection between two sheaths 1a and 1b, with which mechanical stresses, particularly collapsing stress, can be transferred from one sheath 1a to the other sheath 1b. This is all the more the case because the coupling elements 19 snugly encompass the two tubular elements 4 of each sheath 1a and 1b.

The socket 8 is designed so that the inner dimensions of each portion encompassing the shaft 1a, 1b and the coupling element 19 correspond to the outer dimensions of each encompassed sheath 1a, 1b and coupling element 19.

FIG. 2 shows a view of the point at which the sheaths 1a, 1b connect with the coupling element 19. The half portions 8a of the sockets 8 are visible. On one side, the half portions 8a are fitted with a hinge 11 which connects them flexibly in the axial direction with the half portions 8b which are not shown. On the opposite side, the half portions 8a are fitted with connecting means 12 for connecting the half portions 8a with the half portions 8b.

FIG. 3, which represents a section along line III—III of FIG. 1 through one of the sockets 8, illustrates the construction of socket 8. It consists of two half portions 8a and 8b. The portions 8a and 8b are connected at one connecting point by the hinge 11 in such a way that they are mutually pivotable. Each of the half portions 8a and 8b is provided at the point of connection on the hinged side with a web 13 and 14, which extend over practically the whole width of the socket, as can be seen in FIG. 2, and which are connected to each other on the outside by a moulded-on film 15. In FIG. 3, the dash-dot line shows one position of the pivoted-up half portion 8a. Affixed to the connecting point of the two half portions 8a and 8b which lies opposite the hinged side, are connecting means 12 for fixing the two half portions 8a and 8b when assembled. Connecting means 12 consists of an arm 20 which is disposed on the half portion 8b, and a hook 16, which is disposed on the half portion 8a.

When the two half portions 8a and 8b are pressed together, the hook 16 is flexibly pressed back by the arm 20 over the chamfered surface 17 and its retaining surface 18 then snaps like a latch into the arm 20 when the end position is reached.

The section of FIG. 3 shows that the two half portions 8a and 8b fully encompass the corresponding sheath 1a, 1b, resp. its protrusion 2a. It is immediately clear to any person skilled in the art that the device of the invention can also be used in an appropriate design for non-oval sheaths.

In the arrangements described above, the sheaths 1a and 1b are made of plastic and the connecting element 1, the coupling element 19 and the sockets 8 are also advantageously made of plastic.

It is also intended, as shown by the dashes in FIG. 1, that an injection, de-airing or de-watering connection 21 be joined to the coupling element 19. To do so, a sufficiently large gap is required between the individual sheath ends 22 shown by the dashed line.

I claim:

1. A device for connecting two sheaths intended for receiving prestressing cables in concrete supporting structures, wherein said sheaths substantially abut in their axial direction and which are each provided with ends in proximity with each other, protrusions spaced at a distance one from the other, and end portions extending from said protrusions to said ends, said sheaths having outer surfaces, the diameter of the outer surface of said end portions and of said sheaths on the opposite side of said protrusions being equal, said device comprising:

a hollow, essentially tubular coupling element connecting said sheaths, said coupling element having two ends and having an inner surface which corresponds in diameter with the outer surfaces of the two sheaths and further having a flange at each of its two ends, said coupling element being adapted to be pushed onto the end portion of one sheath until one flange of said coupling element is in proximity with the aforesaid protrusion of said one sheath and the other sheath being adapted to be inserted into said coupling element until the other flange of said coupling element is in proximity with the aforesaid protrusion of the other sheath;

two sockets, each comprising a pair of connecting portions which disposed centrally on the inside, have an encircling trapezoidal groove whose ring-shaped sloping surfaces engage the protrusions and flanges and serve to fix the protrusions of the sheaths adjacent said flanges; and two sealing means, one of which is disposed between the protrusion of the one sheath and one of the flanges on the coupling elements, and the other of which is disposed between the protrusion of the other sheath and the other flange on the coupling element.

2. The device of claim 1, wherein the flanges of the coupling element are inclined in relation to the surface of the coupling element by an angle which corresponds essentially to the angle of the sloping surfaces of the encircling trapezoidal groove and the pitch angle of the protrusion of the sheaths.

3. The device of claim 1, wherein the length of the coupling element is measured so that total length of sheaths to be joined can be adapted to a required total length.

4. The device of claim 1, wherein the sealing means comprises of a flexible sealing ring disposed between each one of the protrusions of the sheaths and each one of the flanges of the coupling element.

5. The device of claim 1, wherein the socket comprises of two half portions which are joined together in the axial direction by a hinge at a common connecting point and are fitted at the other connecting point with connecting means.

6. The device of claim 5, wherein the connecting means comprises of a hook affixed to one of the half portions and of an arm affixed to the other half portion, into which the hook can latch.

7. The device of claim 1, wherein the inner dimensions of the edge portions of the socket bordering the central portion with the encircling trapezoidal groove correspond to the outer dimensions of the encompassing sheath and coupling element.

8. A device for connecting two sheaths intended for receiving prestressing cables in concrete supporting structures, wherein said sheaths substantially abut in their axial direction and which are each provided with ends in proximity with each other, protrusions spaced at a distance one from the other, and end portions extending from said protrusions to said ends, said sheaths having outer surfaces, the diameter of the outer surface of said end portions and of said sheaths on the opposite side of said protrusions being equal, said device comprising:
a hollow, essentially tubular coupling element connecting said sheaths, said coupling element having two ends and having an inner surface which corresponds in diameter with the outer surfaces of the two sheaths and further having a flange at each of its two ends,
said coupling element being adapted to be pushed onto the end portion of one sheath until one flange of said coupling element is in proximity with the aforesaid protrusion of said one sheath and the other sheath being adapted to be inserted into said coupling element until the other flange of said coupling element is in proximity with the aforesaid protrusion of the other sheath;
two sockets, each comprising a pair of connecting portions which, disposed centrally on the inside, have an encircling trapezoidal groove whose ring-shaped sloping surfaces engage the protrusions and flanges and serve to fix the protrusions of the sheaths adjacent said flanges wherein each socket comprises two half portions which are joined together in the axial direction by a hinge at a common connecting point and are fitted to the other connecting point by connecting means; and
two sealing means, one of which is disposed between the protrusion of the one sheath and one of the flanges on the coupling element, and the other of which is disposed between the protrusion of the other sheath and the other flange on the coupling element.

9. The device of claim 8, wherein the flanges of the coupling element are inclined in relation to the surface of the coupling element by an angle which corresponds essentially to the angle of the sloping surfaces of the encircling trapezoidal groove and the pitch angle of the protrusion of the sheaths.

10. The device of claim 8, wherein the length of the coupling element is measured so that total length of sheaths to be joined can be adapted to a required total length.

11. The device of claim 8, wherein the sealing means comprises a flexible sealing ring disposed between each one of the protrusions of the sheaths and each one of the flanges of the coupling element.

12. The device of claim 8, wherein the connecting means comprises a hook affixed to one of the half portions and of an arm affixed to the other half portion into which the hook can latch.

13. The device of claim 8, wherein the inner dimensions of the edge portions of the socket bordering the central portion with the encircling trapezoidal groove correspond to the outer dimensions of the encompassing sheath and coupling element.

14. A device for connecting two sheaths intended for receiving prestressing cables in concrete supporting structures, wherein said sheaths substantially abut in their axial direction and which are each provided with ends in proximity with each other, protrusions spaced at a distance one from the other, and end portions extending from said protrusions to said ends, said sheaths having outer surfaces, the diameter of the outer surface of said end portions and said sheaths on the opposite side of said protrusions being equal, said device comprising:
a hollow, essentially tubular coupling element connecting said sheaths, said coupling element having two ends and having an inner surface which corresponds in diameter with the outer surfaces of the two sheaths and further having a flange at each of its two ends,
said coupling element overlying the end portion of said sheaths and said flanges of said coupling element being in proximity with the aforesaid protrusions of said sheaths;
two sockets, each comprising a pair of connecting portions which, disposed centrally on the inside, have an encircling trapezoidal groove whose ring-shaped sloping surfaces engage the protrusions and flanges and serve to fix the protrusion of the sheaths adjacent said flanges; and
two sealing means, one of which is disposed between the protrusion of the one sheath and one of the flanges on the coupling element, and the other of which is disposed between the protrusion of the other sheath and the other flange on the coupling element.

* * * * *